US010727749B1

(12) United States Patent
Chen et al.

(10) Patent No.: US 10,727,749 B1
(45) Date of Patent: Jul. 28, 2020

(54) DUAL RAIL POWER SUPPLY SYSTEM

(71) Applicant: Dialog Semiconductor (UK) Limited, London (GB)

(72) Inventors: Cheng-Teng Chen, Chupei (TW); Ruei-Hong Peng, Toufen (TW); Yuan Wen Hsiao, Hsinchu (TW); Alan Somerville, San Jose, CA (US)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 16/427,970

(22) Filed: May 31, 2019

(51) Int. Cl.
*H02M 3/158* (2006.01)
*H02M 1/00* (2006.01)

(52) U.S. Cl.
CPC .... *H02M 3/1584* (2013.01); *H02M 2001/009* (2013.01); *H02M 2001/0009* (2013.01); *H02M 2001/0025* (2013.01)

(58) Field of Classification Search
CPC ....... H02M 3/1584; H02M 2001/0025; H02M 2001/0009; H02M 2001/009
See application file for complete search history.

(56) References Cited

U.S. PATENT DOCUMENTS

| | | | | | |
|---|---|---|---|---|---|
| 6,952,123 | B2* | 10/2005 | Kizer | ........................ | G06F 1/10 327/147 |
| 2010/0026267 | A1* | 2/2010 | Easwaran | ............. | H02M 3/158 323/288 |
| 2012/0169307 | A1* | 7/2012 | Chen | ..................... | H02M 3/158 323/271 |
| 2012/0249103 | A1* | 10/2012 | Latham, II | ............ | H02M 3/158 323/282 |
| 2016/0380455 | A1* | 12/2016 | Greening | ............... | H02J 7/0044 320/114 |
| 2019/0334480 | A1* | 10/2019 | Nomiyama | ............. | H03F 3/183 |
| 2019/0356215 | A1* | 11/2019 | Lin | ........................ | H02M 3/158 |

* cited by examiner

*Primary Examiner* — Adolf D Berhane
*Assistant Examiner* — Kevin H Sprenger
(74) *Attorney, Agent, or Firm* — Saile Ackerman LLC; Stephen B. Ackerman

(57) ABSTRACT

A dual rail power supply system and a method for providing a first voltage and a second voltage to a load are presented. The power supply system draws a load current from the dual rail power supply system. The system has a first voltage rail for coupling to a first terminal of the load, a second voltage rail for coupling to a second terminal of the load, a first power converter to provide the first voltage at the first voltage rail, a second power converter to provide the second voltage at the second voltage rail, a third power converter comprising a first output coupled to the first voltage rail and a second output coupled to the second voltage rail. The third power converter generates a slave current and provides the slave current to the load such that the load current comprises the slave current, during a first mode.

22 Claims, 12 Drawing Sheets

DUAL RAIL POWER SUPPLY SYSTEM

TECHNICAL FIELD

The present disclosure relates to a dual rail power supply system. In particular the present disclosure relates to a dual rail power supply system for providing a first voltage and a second voltage to a load that is configured to draw a load current from the dual rail power supply.

BACKGROUND

A dual rail power supply system is an apparatus for supplying two output voltages. A dual rail power supply system may comprise a positive voltage rail and a negative voltage rail, where the voltage provided at the negative voltage may be equal to the negative of the voltage provided at the positive voltage rail.

FIG. 1 is a schematic of a multi-phase dual rail power supply system 100. The power supply system 100 comprises a positive voltage rail 102 at an output voltage VO1 and a negative voltage rail 104 at an output voltage VO2. The output voltage VO2 in the present example is equal to the negative of the output voltage VO1. Other examples of multi-phase dual rail power supply systems may have an output voltage VO2 that is unequal to the negative of the output voltage VO1. The power supply system 100 comprises a multi-phase boost converter 106 and a multi-phase inverter converter 108. Also shown is a load 110 that draws a load current I_LOAD from the power supply system 100. The load 110 is represented by a current source and is coupled between the voltage rails 102, 104.

The multi-phase boost converter 106 comprises two boost converters 106a, 106b and the multi-phase inverter converter 108 comprises two inverters 108a, 108b. The boost converter 106a comprises an inductor 112, two switches 114, 116 and a capacitor 118. The boost converter 106b comprises an inductor 120, two switches 122, 124 and a capacitor 126. The inverter 108a comprises an inductor 128, two switches 130, 132 and a capacitor 134. The inverter 108b comprises an inductor 136, two switches 138, 140 and a capacitor 142. Inputs of the boost converter 106a and the inverter 108a are coupled to a voltage supply 144 providing an input voltage VIN and a first terminal of a capacitor 146 with a second terminal coupled to ground. Inputs of the boost converter 106b and the inverter 108b are coupled to the voltage supply 144.

Dual rail power supply systems may be single phase or dual phase. A single phase dual rail power supply system may, for example, comprise a single boost converter (comprising an inductor) and a single inverter (comprising another inductor) configured to provide the two output voltages. A single phase dual rail power supply system only requires a single power stage to provide energy. Due to the saturation current of the inductors included in single phase systems they are typically not able to provide a sufficiently high output current to support the load current requirements of many modern electronic systems. This problem was overcome by the introduction of multi-phase systems, such as the power supply system 100, that can support high current positive voltage rail and negative voltage rail applications that require higher load currents. Compared to a single-phase system, a multi-phase power supply system can be used to increase the output current capability in high output current demand systems.

However, a drawback is that a multi-phase system needs more inductors than a single phase system; four inductors are required to realize high output current capability via multi-phase control, as shown in FIG. 1. Furthermore, the multi-phase system requires greater printed circuit board (PCB) area and more components (for example passive components). This means the cost is higher when compared to a single-phase system and the circuitry becomes more complex due to more phases and the requirement for an additional current balance control circuit.

SUMMARY

It is desirable to provide a dual rail power supply system that can support high current applications whilst minimising the number of components, such as inductors, and limiting the PCB area that is required.

According to a first aspect of the disclosure there is provided a dual rail power supply system for providing a first voltage and a second voltage to a load that is configured to draw a load current from the dual rail power supply system, comprising a first voltage rail for coupling to a first terminal of the load, a second voltage rail for coupling to a second terminal of the load, a first power converter configured to provide the first voltage at the first voltage rail, a second power converter configured to provide the second voltage at the second voltage rail, a third power converter comprising a first output coupled to the first voltage rail and a second output coupled to the second voltage rail, wherein the third power converter is configured to generate a slave current and to provide the slave current to the load such that the load current comprises the slave current, during a first mode.

Optionally, the first power converter and the second power converter are configured to provide a master current to the load during the first mode, such that the load current comprises the master current and the slave current Optionally, the first power converter and the second power converter are configured to provide the master current to the load during a second mode, such that the load current comprises the master current.

Optionally, the third power converter is configured to switch off during the second mode such that the load current does not comprise the slave current during the second mode.

Optionally, the dual rail power supply system is configured to switch from the second mode to the first mode when the load current requested by the load exceeds a threshold current and/or to switch from the first mode to the second mode when the load current requested by the load falls below the threshold current.

Optionally, the first power converter comprises a switching converter.

Optionally, the switching converter comprises one of a buck converter, a boost converter and a capacitive converter.

Optionally, the second power converter comprises an inverter or a negative capacitive converter.

Optionally, the first voltage is approximately equal to a negative of the second voltage.

Optionally, the first voltage is unequal to a negative of the second voltage.

Optionally, the third power converter comprises a single inductor dual output (SIDO) converter.

Optionally, the SIDO converter comprises a first inductor.

Optionally, the SIDO converter comprises a first set of switches configured to couple the first inductor between a third voltage and a fourth voltage in a first state and to decouple the first inductor from the third voltage and the fourth voltage in a second state, and a second set of switches configured to couple the first inductor between the first voltage rail and second voltage rail in the first state and to decouple the first inductor from the first voltage rail and the second voltage rail in the second state.

Optionally, the third voltage is greater than the fourth voltage.

Optionally, the third voltage is a supply voltage and the fourth voltage is ground.

Optionally, the first inductor is charged when the first set of switches are in the first state and the second set of switches are in the second state, and the first inductor is discharged to provide the slave current to the load when the first set of switches are in the second state and the second set of switches are in the first state.

Optionally, the SIDO converter comprises a controller configured to control a switching operation of the first set of switches and the second set of switches, by switching each of the sets of switches between the first state and the second state.

Optionally, the controller is configured to provide one of current mode control, voltage mode control, hysteresis mode control and constant on/off time mode control.

Optionally, the controller is configured to provide current mode control by sensing an inductor current and controlling the switching operation of the first set of switches and the second set of switches based on the sensed inductor current, the inductor current being a current flowing through the first inductor.

Optionally, the controller comprises a current sensor configured to sense the inductor current and to provide a feedback voltage that is a replica of the slave current or an average of the slave current, wherein the switching operation of the first set of switches and the second set of switches are dependent on the feedback voltage.

Optionally, the controller comprises a transient detector configured to detect a transient in at least one of the first voltage and the second voltage, and to adjust the slave current to compensate for the transient, when a transient is detected.

Optionally, the controller comprises an error amplifier configured to receive input signals that are dependent on the feedback voltage and the detection of transients, provide an error amplifier output signal, wherein the switching operation of the first set of switches and the second set of switches are dependent on the error amplifier output signal.

Optionally, the controller comprises a transient detector configured to detect a transient in at least one of the first voltage and the second voltage, and to adjust the slave current to compensate for the transient, when a transient is detected.

Optionally, the first set of switches comprises a first switch and a third switch, the second set of switches comprises a second switch and a fourth switch, the first switch comprises a first terminal coupled to the third voltage and a second terminal coupled to a first inductor node, the second switch comprises a first terminal coupled to the first inductor node and a second terminal coupled to the second voltage rail, the third switch comprises a first terminal coupled to a second inductor node and a second terminal coupled to the fourth voltage, the fourth switch comprises a first terminal coupled to the second inductor node and a second terminal coupled to the first voltage rail, and the first inductor comprises a first terminal coupled to the first inductor node and a second terminal coupled to the second inductor node.

Optionally, the SIDO converter comprises a controller configured to control a switching operation of the first set of switches and the second set of switches, by switching each of the sets of switches between the first state and the second state.

Optionally, the controller is configured to provide current mode control by sensing an inductor current and controlling the switching operation of the first set of switches and the second set of switches based on the sensed inductor current, the inductor current being a current flowing through the first inductor.

Optionally, the inductor current is sensed at the second inductor node.

Optionally, the controller comprises a current sensor configured to sense the inductor current and to provide a feedback voltage that is a replica of the slave current or an average of the slave current, wherein the switching operation of the first set of switches and the second set of switches are dependent on the feedback voltage.

According to a second aspect of the disclosure there is provided a method of providing a dual rail power supply system for providing a first voltage and a second voltage to a load that is configured to draw a load current from the dual rail power supply system, the dual rail power supply system comprising a first voltage rail for coupling to a first terminal of the load, a second voltage rail for coupling to a second terminal of the load, the method comprising providing the first voltage at the first voltage rail using a first power converter, providing the second voltage at the second voltage rail using a second power converter, generating a slave current and providing the slave current to the load such that the load current comprises the slave current, during a first mode, using a third power converter comprising a first output coupled to the first voltage rail and a second output coupled to the second voltage rail.

It will be appreciated that the method of the second aspect may include providing and/or using features set out in the first aspect and can incorporate other features as described herein.

According to a third aspect of the disclosure there is provided a dual rail power supply system for providing a first voltage and a second voltage to a load that is configured to draw a load current from the dual rail power supply system, comprising a first voltage rail for coupling to a first terminal of the load, a second voltage rail for coupling to a second terminal of the load, one or more first power converters configured to provide the first voltage at the first voltage rail, one or more second power converters configured to provide the second voltage at the second voltage rail, one or more third power converters comprising a first output coupled to the first voltage rail and a second output coupled to the second voltage rail, wherein the third power converter is, or the third power converters are, configured to generate a slave current and to provide the slave current to the load such that the load current comprises the slave current, during a first mode.

It will be appreciated that the dual rail power supply system of the third aspect may include providing and/or using features set out in the first aspect and can incorporate other features as described herein.

According to a fourth aspect of the disclosure there is provided a method of providing a dual rail power supply system for providing a first voltage and a second voltage to a load that is configured to draw a load current from the dual rail power supply system, the dual rail power supply system comprising a first voltage rail for coupling to a first terminal of the load, a second voltage rail for coupling to a second terminal of the load, the method comprising providing the first voltage at the first voltage rail using one or more first power converters, providing the second voltage at the second voltage rail using one or more second power converters, generating a slave current and providing the slave current to the load such that the load current comprises the slave current, during a first mode, using one or more third power converters comprising a first output coupled to the first voltage rail and a second output coupled to the second voltage rail.

It will be appreciated that the method of the fourth aspect may include providing and/or using features set out in the third aspect and can incorporate other features as described herein.

BRIEF DESCRIPTION OF THE DRAWINGS

The disclosure is described in further detail below by way of example only and with reference to the accompanying drawings in which.

DESCRIPTION

Figure 2:
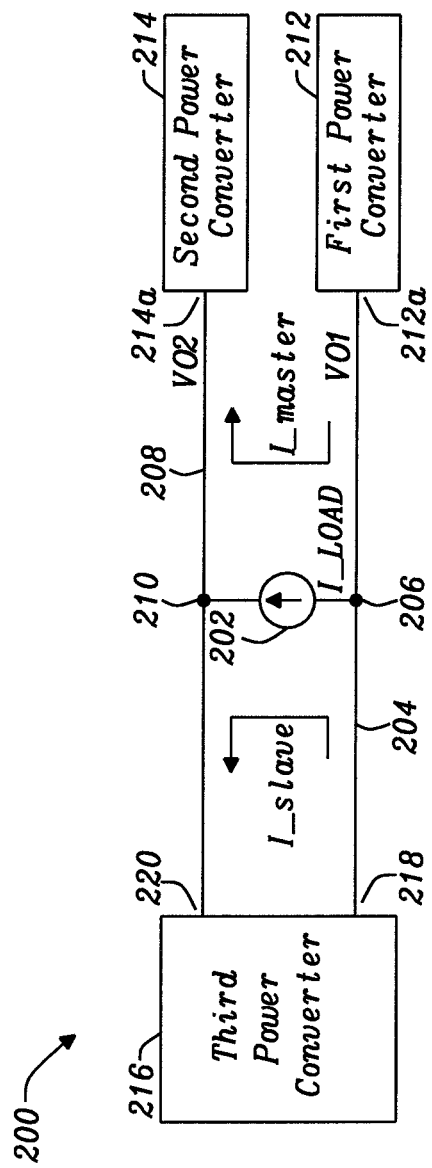
FIG. 2 is a schematic of a dual rail power supply system in accordance with a first embodiment of the present disclosure.

FIG. 2 is a schematic of a dual rail power supply system 200 for providing a first voltage VO1 and a second voltage VO2 to a load 202 in accordance with a first embodiment of the present disclosure. The load 202 is configured to draw a load current I_LOAD from the dual rail power supply system 200. The power supply system 200 comprises a first voltage rail 204 for coupling to a first terminal 206 of the load 202 and a second voltage rail 208 for coupling to a second terminal 210 of the load 202.

The power supply system 200 further comprises a first power converter 212 configured to provide the first voltage VO1 at the first voltage rail 204 and a second power converter 214 configured to provide the second voltage VO2 at the second voltage rail 208.

The first power converter 212 comprises an output 212a that is coupled to the first voltage rail 204. The first power converter 212 acts to generate, regulate or otherwise provide the first voltage VO1 at the output 212a such that the first voltage rail 204 is at the first voltage VO1.

The second power converter 214 comprises an output 214a that is coupled to the second voltage rail 208. The second power converter 214 acts to generate, regulate or otherwise provide the second voltage VO2 at the output 214a such that the second voltage rail 208 is at the second voltage VO2.

The power supply system 200 further comprises a third power converter 216 comprising an output 218 coupled to the first voltage rail 204 and an output 220 coupled to the second voltage rail 208.

The third power converter 216 is configured to generate a slave current I_slave and to provide the slave current I_slave to the load 202 such that the load current I_LOAD comprises the slave current I_slave, during a first mode.

The outputs 212a and 214a are coupled to the outputs 218 and 220, respectively. In effect the third power converter 216 acts as a slave current I_slave supplier that provides more current for the outputs 212a, 214a of the power converters 212, 214.

In the present embodiment, the first power converter 212 and the second power converter 214 are configured to provide a master current I_master to the load 202 during the first mode, such that the load current I_LOAD comprises the master current I_master and the slave current I_slave. In the present embodiment, during the first mode the load current I_LOAD is equal to the sum of the master current I_master and the slave current I_slave. Therefore, the third power converter 216 acts to provide additional current, in the form of the slave current I_slave, to the load 202, thereby reducing the current required from the master current I_master provided by the power converters 212, 214. This enables the power supply system 200 to provide a sufficiently high output current to meet higher load current I_LOAD requirements than single phase systems.

In summary, a output current of the third power converter 216 is the slave current I_slave and an output current of the power converters 212, 214 is the master current I_master. An output current of the power system 200 is the load current I_LOAD, which is the sum of the slave current I_slave and the master current I_master.

The third power converter 216 only acts to regulate its output current (the slave current I_slave) and does not provide a regulated output voltage. The third power converter 216 functions as a current supply to supply an output current (the slave current I_slave) to both of the voltage rails 204, 208 simultaneously.

The first power converter 212 and the second power converter 214 may be configured to provide the master current I_master to the load 202 during a second mode, such that the load current I_LOAD comprises the master current I_master. The third power converter 216 may be configured to switch off during the second mode such that the load current I_LOAD does not comprise the slave current I_slave during the second mode. The power supply system 200 may be configured to switch from the second mode to the first mode when the load current I_LOAD requested by the load 202 exceeds a threshold current. Additionally, the power supply system 200 may be configured to switch from the first mode to the second mode when the load current I_LOAD requested by the load 202 falls below the threshold current.

During operation of the power supply system 200 the second mode may be a mode where the master current I_master alone is sufficiently high to provide the load current I_LOAD based on the demand from the load 202. The threshold current may be a value of the load current I_LOAD beyond which the master current I_master is insufficient on its own to support. At this stage, the power supply system 200 can switch to the first mode where the third power converter 216 is enabled. In the first mode the load current I_LOAD is provided from both the master current I_master and the slave current I_slave and therefore the power supply system 200 can support larger load currents I_LOAD than in the first mode.

The power supply system 200 may be referred to as having a master-slave power system architecture.

Figure 3:
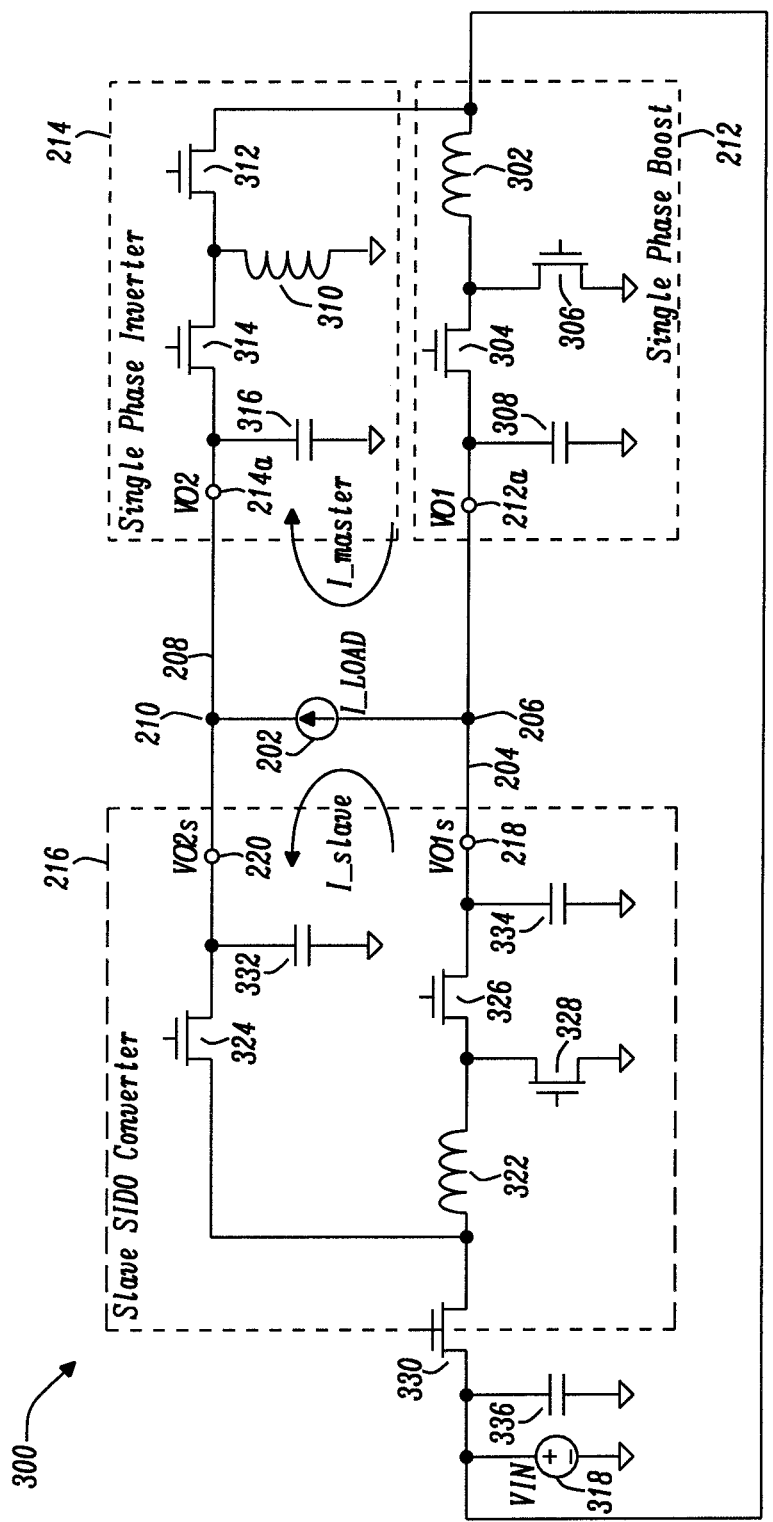
FIG. 3 is a schematic of a dual rail power supply system in accordance with a second embodiment of the present disclosure.

FIG. 3 is a schematic of a dual rail power supply system 300 in accordance with a second embodiment of the present disclosure. The power supply system 300 shows a specific implementation of the third power converter 216 and power converters 212, 214 of the power supply system 200 of FIG. 2. Therefore, the power supply system 300 operates substantially as described for the power supply system 200. Furthermore, common reference numerals and variables are used to represent common features between Figures.

The first power converter 212 comprises a switching converter, for example a buck converter, a boost converter or a capacitive converter. In the present embodiment the first power converter 212 comprises a boost converter. The second power converter 214 comprises an inverter in the present embodiment. In a further embodiment, the second power converter 214 may comprise another type of power converter in accordance with the understanding of the skilled person. For example, the second power converter 214 may comprise a negative capacitive converter.

The first power converter 212 comprises an inductor 302, two switches 304, 306 and a capacitor 308. The second power converter 214 comprises an inductor 310, two switches 312, 314 and a capacitor 316. Inputs of the first power converter 212 and the second power converter 214 are coupled to a voltage supply 318 providing an input voltage VIN.

In the present embodiment, the first voltage rail 204 is a positive voltage rail, as generated by the boost converter (the first power converter 212) and the second voltage rail 208 is a negative voltage rail, as generated by the inverter (the second power converter 214). In the present embodiment, the first voltage VO1 is approximately equal to a negative of the second voltage VO2. In further embodiments, the first voltage VO1 may be unequal to the second voltage VO2. The first and second voltages VO1, VO2 may have any appropriate value, in accordance with the understanding of the skilled person.

Figure 1:
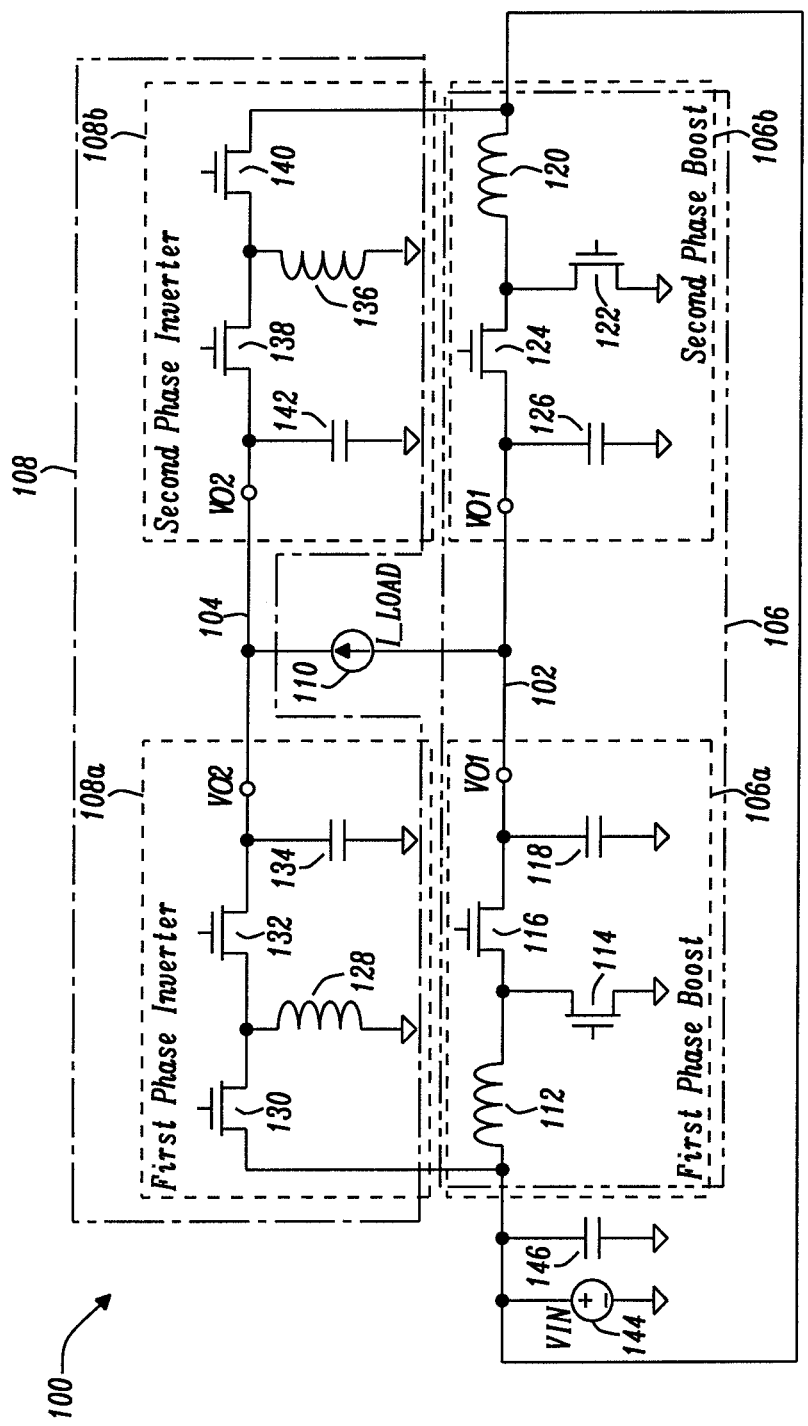
FIG. 1 is a schematic of a multi-phase dual rail power supply system.

In the present embodiment the third power converter 216 is a single inductor dual output (SIDO) converter 216. In the present embodiment, the SIDO converter 216 comprises an inductor 322, four switches 324, 326, 328, 330 and two capacitors 332, 334. Only one inductor (the inductor 322) is needed to achieve a sufficiently high output current, rather than two inductors as is the case in the multi-phase dual rail power supply system 100 shown in FIG. 1. An input of the SIDO converter 216 is coupled to the voltage supply 318 providing the input voltage VIN and a first terminal of a capacitor 336 which has a second terminal coupled to ground. It will be appreciated that in a further embodiment, a different voltage supply may be coupled to the input of the SIDO converter 216.

For dual rail applications, it is desirable that the saturation current of the inductor of the boost converter 212 is the same as the saturation current of the inductor 214 of the inverter 214. There is no requirement that the saturation current of the inductor 322 of the SIDO converter 216 matches those of the boost converter 212 or the inverter 214.

As discussed previously, due to the saturation current of the inductors included in single phase systems they are typically not able to provide a sufficiently high output current to support the load current requirements of many modern electronic systems. No inductor is available in the market with a high enough saturation current (within the form factor restrictions for mobile devices, for example a maximum height of 1 mm), that would allow a single boost or inverter to provide the specified voltage and current. Therefore, in the present disclosure, the solution includes providing the SIDO converter 216 as described herein to provide the slave current I_slave.

Figure 4A:
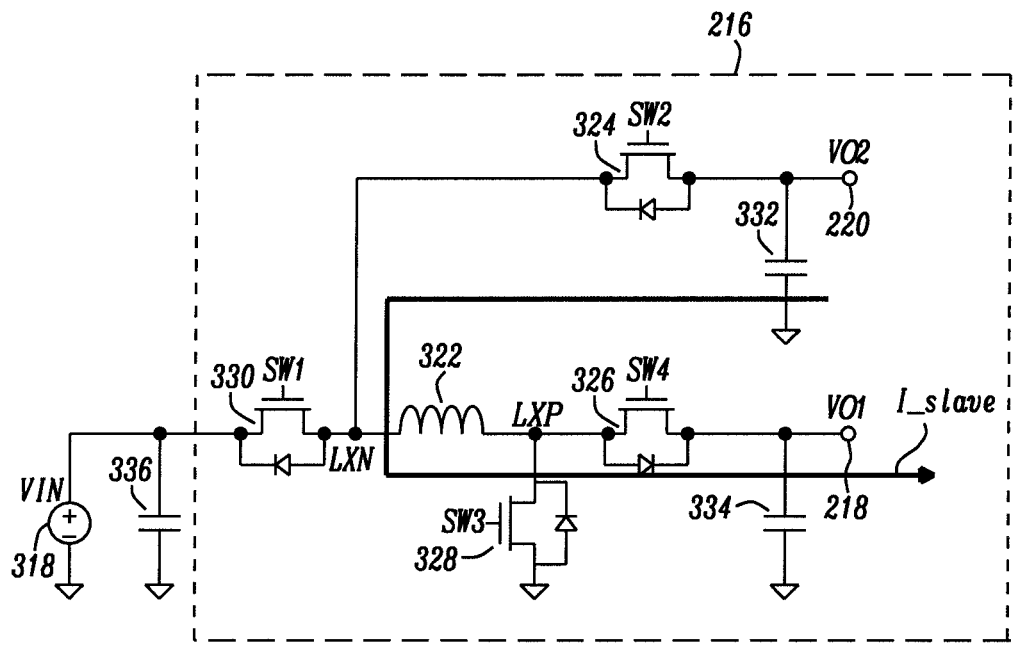
FIG. 4A is a schematic of the single inductor dual output (SIDO) converter as shown in FIG. 3.

FIG. 4A is a schematic of the SIDO converter 216 as previously described. Common features between different Figures share common reference numerals and variables. In the present embodiment the switches 324, 326, 328, 330 are transistors, and in particular are metal oxide field effect transistors (MOSFET). The diodes coupled in parallel with the switches are body diodes. Body diodes represent a physical characteristic of a MOSFET rather than being representative of an additional diode in the circuit as will be clear to the skilled person.

The switches 324, 326, 328 and 330 are also labelled as SW2, SW4, SW3 and SW1, respectively. A node between the inductor 322 and the switch 330 is labelled LXN and a node between the inductor 322 and the switch 326 is labelled LXP.

Figure 4B:
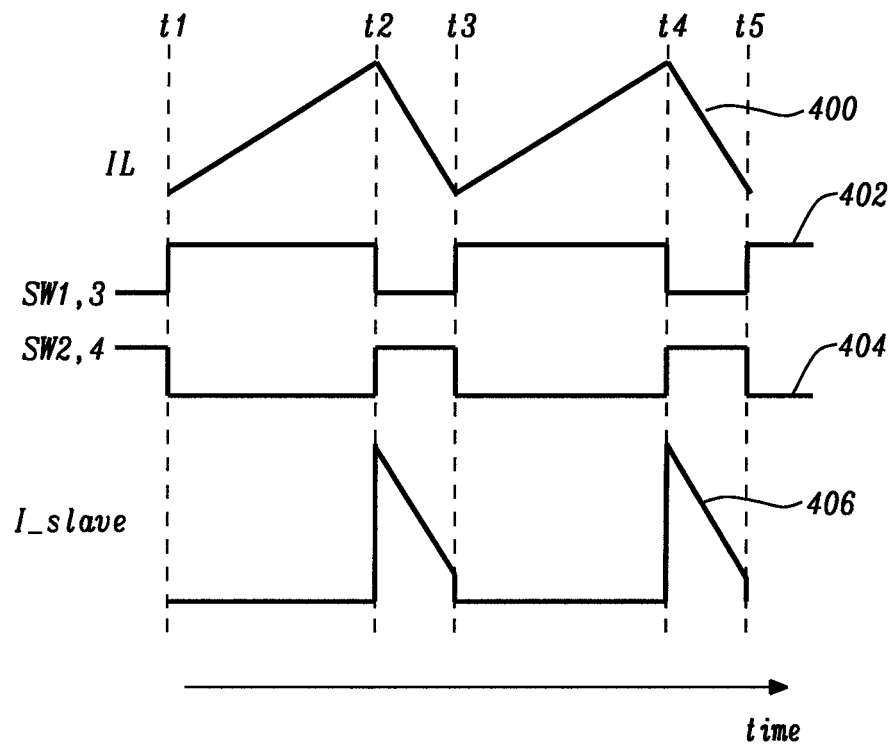
FIG. 4B is a timing diagram showing a switching operation of the SIDO converter.

FIG. 4B is a timing diagram showing a switching operation of the SIDO converter 216. The following traces are shown: an inductor current IL through the inductor 322 (numeral 400); a state of the switches 328, 330 (numeral 402); a state of the switches 324, 326 (numeral 404); and the slave current I_slave (numeral 406).

Regarding the states of the switches 402, 404, a high state indicates that the associated switches are closed and a low state indicates that the associated switches are open. For example, when the state of switches 402 is in the high state, it means that both of the switches 328, 330 are closed. A switch permits the passage of current when it is closed and restricts the passage of current when it is open. As such, when a switch is closed it may be referred to as being on or in an on state or being enabled; when a switch is open it may be referred to as being off or in an off state or being disabled.

The SIDO converter 216 comprises a first set of switches (328+330) comprising the switches 328, 330 and a second set of switches (324+326) comprising the switches 324, 326. Therefore the trace 402 shows the switching operating of the first set of switches (328+330) and the trace 404 shows the switching operation of the second set of switches (324+326).

The first set of switches (328+330) are configured to couple the inductor 322 between a third voltage and a fourth voltage in a first state and to decouple the inductor 322 from the third voltage and the fourth voltage in a second state. The second set of switches (324+326) are configured to couple the inductor 322 between the first voltage rail 204 and second voltage rail 208 in the first state and to decouple the inductor 322 from the first voltage rail 204 and the second voltage rail 208 in the second state. In the present embodiment the third voltage is greater than the fourth voltage and in particular the third voltage is the input voltage VIN and the fourth voltage is ground. Also, the first state is the high state and the second state is the low state, as previously described.

In the present embodiment the inductor 322 is charged when the first set of switches (328+330) are in the high state and the second set of switches (324+326) are in the low state as shown by the traces 400, 402, 404 from a time t1 to a time t2, and from a time t3 to a time t4. The inductor 322 is discharged to provide the slave current I_slave to the load 202 when the first set of switches (328+330) are in the low state and the second set of switches (324+326) are in the high state as shown by the traces 400, 402, 404, 406 from the time t2 to the time t3 and from the time t4 to a time t5.

Between the time t2 and the time t3, and between the time t4 and the time t5, inductor current IL flows from the first voltage rail 204 to the second voltage rail 208 via the load 202. This means that the SIDO converter 216 provides the slave current I_slave to both voltage rails 204, 206 simultaneously.

The switch 330 comprises a first terminal coupled to the third voltage and a second terminal coupled to the node LXN. The switch 324 comprises a first terminal coupled to the node LXN and a second terminal coupled to the second voltage rail 208. The switch 328 comprises a first terminal coupled to the node LXP and a second terminal coupled to the fourth voltage. The switch 326 comprises a first terminal coupled to the node LXP and a second terminal coupled to the first voltage rail 204. The first inductor 322 comprises a first terminal coupled to the node LXN and a second terminal coupled to the node LXP.

Figure 5:
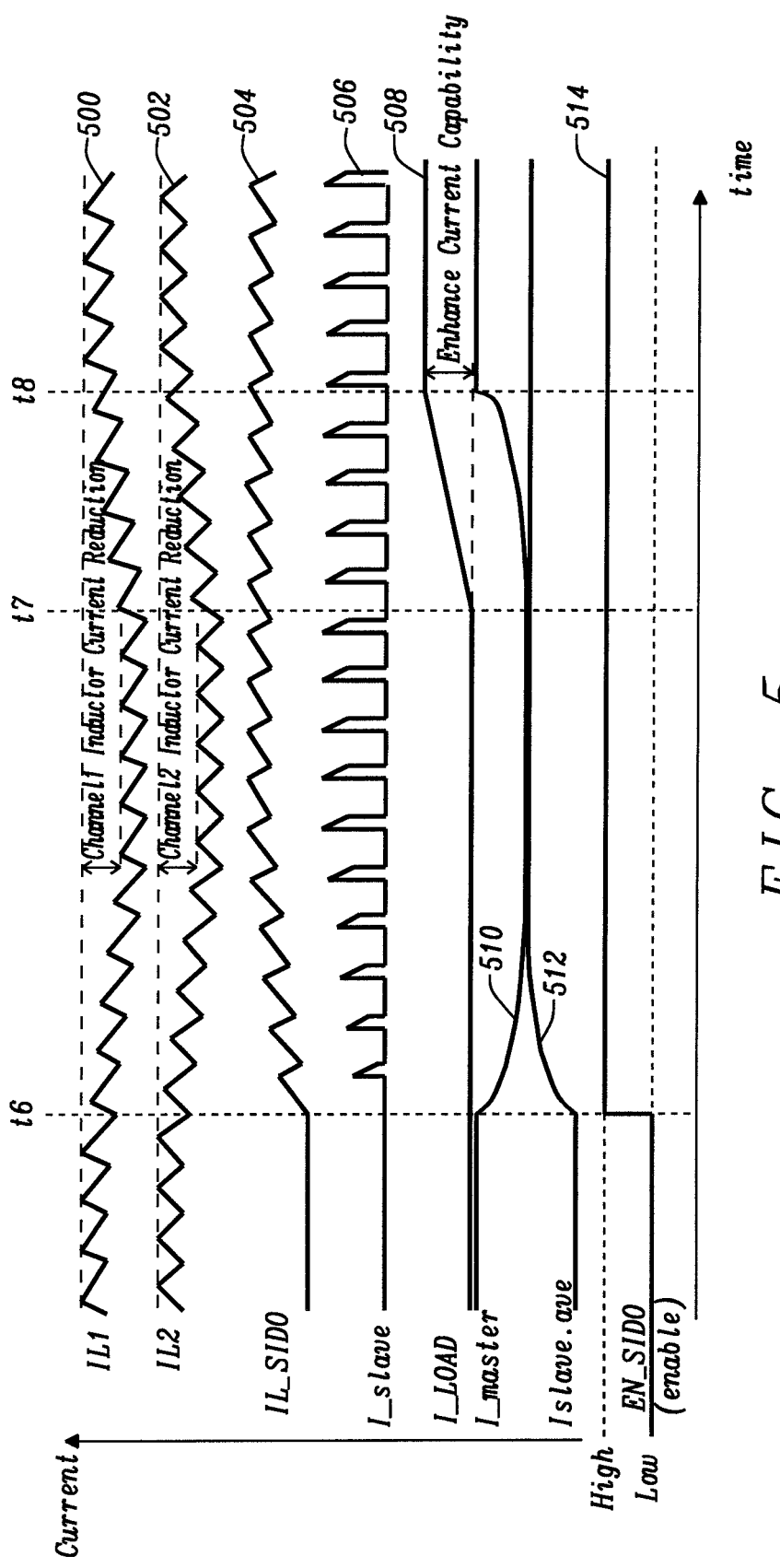
FIG. 5 is a timing diagram showing the operation of the power supply system of FIG. 3.

FIG. 5 is a timing diagram showing the operation of the power supply system 300. The following traces are shown: an inductor current IL1 through the inductor 302 (numeral 500), an inductor current IL2 through the inductor 310 (numeral 502), the inductor current IL_SIDO through the inductor 322 (numeral 504), the slave current I_slave (numeral 506), the load current I_LOAD (numeral 508), the master current I_master (numeral 510), the average slave current Islave.ave over a time period (numeral 512), a state of the SIDO converter 216 (numeral 514), where a high state denotes that the SIDO converter 216 is enabled and a low state denotes that the SIDO converter 216 is disabled.

Prior to a time t6, in an initial state, the SIDO converter 216 is disabled as shown by the low state of the trace 514; the load current I_LOAD is provided by the master current I_master only as shown by traces 508, 510. The inductors 302, 310 are operating in a high current condition. At the time t6 the SIDO converter 216 is enabled, as shown by the trace 514 switching to the high state, and the SIDO converter 216 begins to provide the slave current I_slave (shown by the trace 506) to the load 202. This results in a decrease in the inductor currents IL1, IL2 of the inductors 302, 310 (shown by traces 500, 502) and a reduction in the master current I_master (shown by the trace 510).

Additionally, after the time t6 when the SIDO converter 216 is enabled, the power supply system 300 can drive more current than before and therefore can provide a greater load current I_LOAD. Both voltage rails 204, 208 have additional margin to drive the load current I_LOAD due to the reduction in inductor currents ILL IL2 when the SIDO converter 216 is enabled.

At a time t7, the load current I_LOAD (shown by trace 508) increases until a time t8. During a time period between the time t7 and the time t8, the peak and average of the inductor currents IL1, IL2 (traces 500, 502) and the master current I master (trace 510) increases to their levels prior to the time t6, to support the increase in the load current I_LOAD. Therefore enabling of the SIDO converter 216 at the time t6 means that the power supply system 300 can drive more current than prior to the time t6.

Figure 6A:
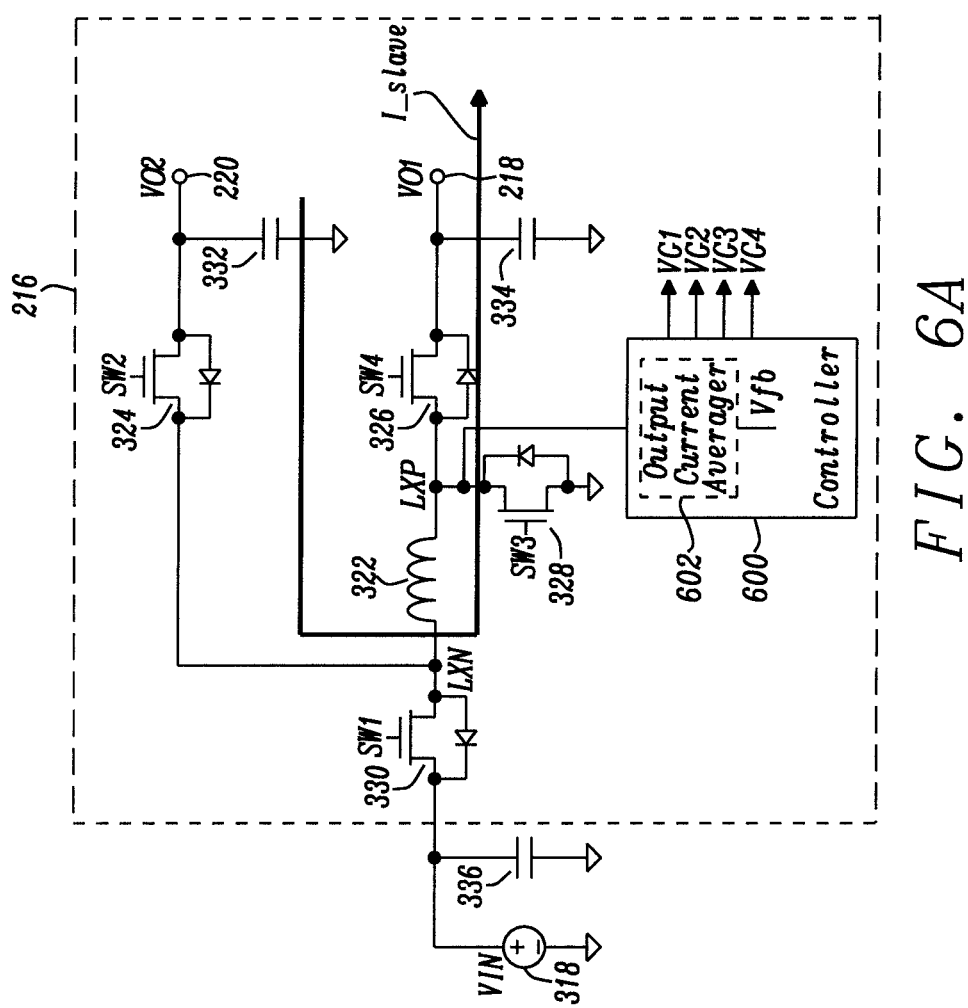
FIG. 6A is a schematic of the SIDO converter of FIG. 4A and a controller in accordance with a third embodiment of the present disclosure.

FIG. 6A is a schematic of the SIDO converter 216 further comprising a controller 600 in accordance with a third embodiment of the present disclosure. The controller 600 forms a control loop. Common features between different Figures share common reference numerals and variables.

The controller 600 is configured to control a switching operation of the first set of switches (328+330) and the second set of switches (324+326), by switching each of the sets of switches between the first state and the second state. In the present embodiment the controller 600 is configured to provide current mode control by sensing the inductor current IL_SIDO and controlling the switching operation of the first set of switches (328+330) and the second set of switches (324+326) based on the sensed inductor current IL_SIDO. The inductor current IL_SIDO is the current that flows through the inductor 322 during operation, as shown by trace 504 in FIG. 5.

In the present embodiment the controller 600 provides the control signals VG1, VG2, VG3, VG4 to the switches 330, 324, 328, 326, respectively, to adjust the gate voltages of each of the switches 330, 324, 328, 326 and therefore to switch each of the switches 330, 324, 328, 326 between their on and off states.

The controller 600 may comprise an output current averager 602, which is a type of current sensor, that is configured to sense the inductor current IL_SIDO and to provide a feedback voltage Vfb that is a replica of the slave current I_slave or an average of the slave current I_slave.ave. The switching operation of the first set of switches (328+330) and the second set of switches (324+326) are dependent on the feedback voltage Vfb.

Figure 6B:
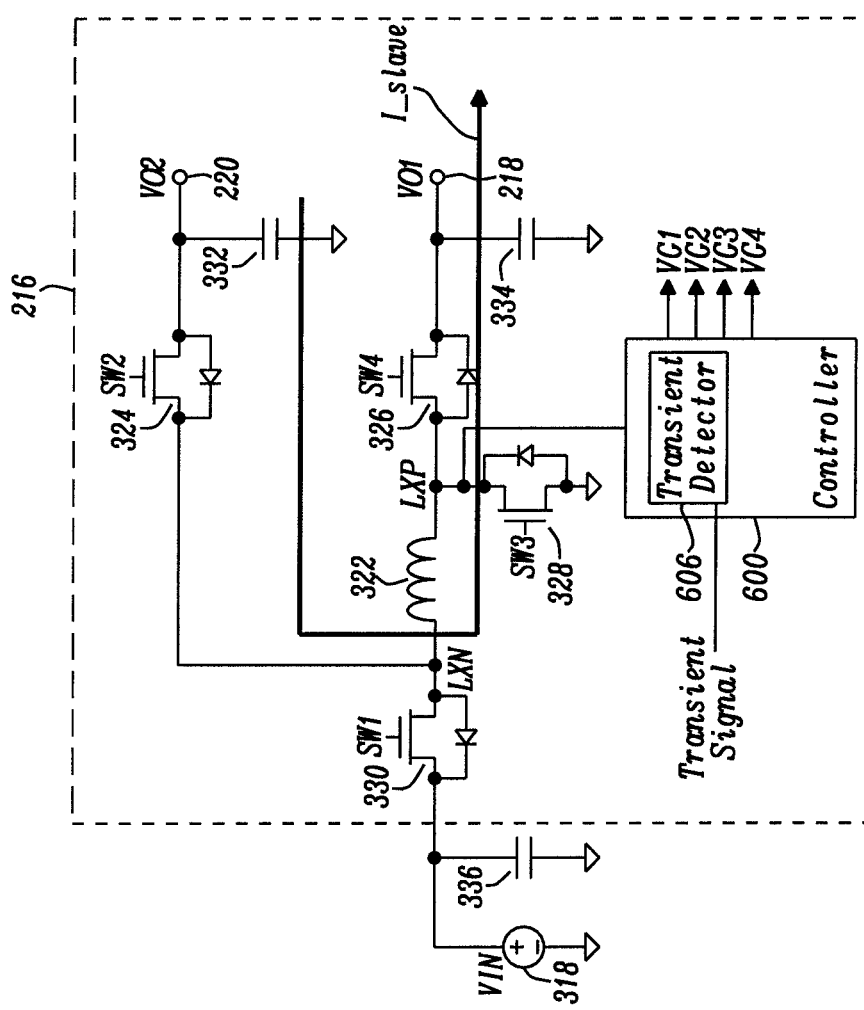
FIG. 6B is a schematic of the SIDO converter of FIG. 4A and a controller in accordance with a fourth embodiment of the present disclosure.

FIG. 6B is a schematic of a the SIDO converter 216 and the controller 600 in accordance with a fourth embodiment of the present disclosure. Common features between different figures share common reference numerals and variables.

In the present embodiment the controller 600 comprises a transient detector 606 that is configured to detect a transient in one or both of the voltages VO1, VO2. When a transient is detected, the transient detector 606 adjusts the slave current I_slave to compensate for the transient. The transient may for example be an overshoot or an undershoot and may occur when the load current I_LOAD varies. In the present embodiment the transient detector 606 receives the transient signal where the transient signal indicates when a transient has occurred.

Figure 6C:
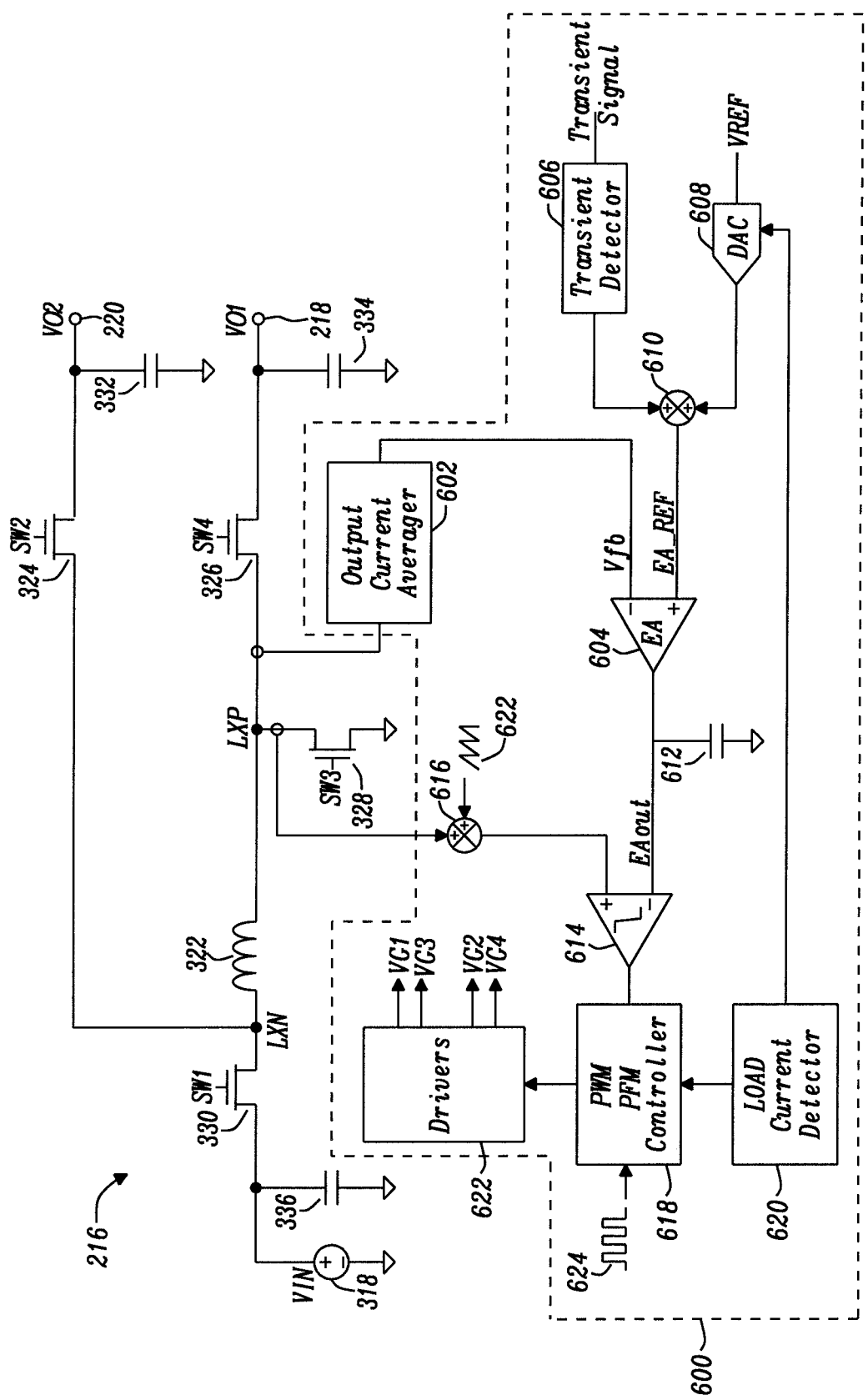
FIG. 6C is a schematic of the SIDO converter of FIG. 4A and a controller in accordance with a fifth embodiment of the present disclosure.

FIG. 6C is a schematic of the SIDO converter 216 and the controller 600 in accordance with a fifth embodiment of the present disclosure and showing a specific embodiment of the controller 600. Common features between different figures share common reference numerals and variables.

In the present embodiment, the controller 600 comprises the output current averager 602, an error amplifier 604 and the transient detector 606. The error amplifier 604 is configured to receive input signals that are dependent on a feedback voltage Vfb as output by the output current averager 602, and the detection of transients as identified by the transient detector 606. The error amplifier 604 is further configured to provide an error amplifier output signal EAout and the switching operation of the first set of switches (328+330) and the second set of switches (324+326) are dependent on the error amplifier output signal EAout.

In this specific embodiment, the controller 600 further comprises the output current a digital to analog converter (DAC) 608, a mixer circuit 610, a capacitor 612, a comparator 614, mixer circuit 616, a pulse width modulation (PWM) controller 618, a load current detector 620 and drivers 622.

The output current averager 602 is coupled to the node LXP and configured to sense the slave current I_slave by the sensing the inductor current IL_SIDO during the time period over which the first set of switches (328+330) are open and the second set of switches (324+326) are closed. The slave current I_slave is sensed at the node LXP and the output current averager 602 is used to convert the sensed slave current I_slave to the feedback voltage Vfb, which may be an averaged voltage. The inductor current IL_SIDO may be sensed periodically with each switching period. The switching period refers to the switching period of the switches (328+330 and 324+326). The switching period is the time taken for a switch or set of switches to switch from a first state to a second state until the switches switch back to the second state. By sensing the inductor current IL_SIDO, the output current averager 602 can provide the feedback voltage Vfb that is a replica of the slave current I_slave as shown in FIG. 5 (trace 506). Using this method it is possible to sense the state of the switches 324, 326. From FIG. 5, it can be seen that the slave current I_slave (trace 506) is a periodic signal that is provided to both of the output voltages VO1, VO2.

In a further embodiment, the output current averager 602 may be implemented using an N-th order lower pass filter to provide the feedback voltage that is a replica of the average slave current I_slave.ave (trace 512).

The error amplifier 604 is configured to receive the feedback voltage Vfb at a first input and an error amplifier reference EA_REF from the mixer 610 at a second input. In operation, the error amplifier 604 will process the voltage difference between the voltage Vfb and the error amplifier reference EA_REF and output the error amplifier output signal EAout.

The mixer 610 is configured to receive a transient detector output from the transient detector 606 which is configured to receive the transient signal. The mixer 610 is also configured to receive a signal from the DAC 608 which is configured to receive a reference voltage VREF. In operation, the mixer 610 mixes the reference voltage VREF with the transient signal.

When there is a transient signal, the reference voltage VREF may be adjusted to adjust the slave current I_slave.

The mixer 616 and the output current averager 602 are coupled to the node LXP. The mixer 616 is configured to receive triangular wave signal 622 and has an output coupled to a first input of the comparator 614. A second input of the comparator 614 is coupled to an output of the error amplifier 604. In operation the comparator 614 compares the error amplifier output signal EAout, as output by the error amplifier 604, with a current sensing triangle signal, where the current sensing triangle signal is a signal output by the mixer 616.

The mixer 616 is configured to mix the sensed slave current I_slave with the triangular wave signal 622 as required for current mode control, to generate the current sensing triangle signal.

An output of the comparator 614 is coupled to the PWM controller 618. A digital signal is provided from the output of the comparator 614 to the PWM controller 618. The digital signal provided from the output of the comparator 614 comprises high and low logic levels.

The PWM controller 618 is also configured to receive a digital signal 624 and a signal from the load current detector 620. The load current detector 620 is configured to detect the load current I_LOAD and to provide the signal at its output that is representative of the detected load current I_LOAD. The PWM controller 618 comprises an output coupled to the driver 622, where the drivers 622 are configured to generate the control signals VG1, VG2, VG3, VG4 using a signal received from the PWM controller 618.

The controller 600 forms a PWM control loop that enables the SIDO converter 216 to output the slave current I_slave, which may be a constant current. In the present embodiment, the PWM control loop operates in a peak current mode. It will be appreciated that in further embodiments, the SIDO converter 216 may be configured to operate in a different control mode in accordance with the understanding of the skilled person. For example, the controller 600 of the SIDO converter 216 may be configured to operate the SIDO converter 216 in one of the following control modes: voltage mode control, current mode control, hysteresis mode control or constant on/off time mode control.

To prevent the boost converter 212 and the inverter 214 from operating in reverse to absorb excess current it is necessary that the inductor current IL_SIDO is less than the load current I_LOAD. It is difficult to violate this criterion because the SIDO converter 216 has a higher duty cycle than a single phase converter, which means that the current capability of the SIDO converter 216 is smaller than a single phase converter using the same type of inductor. Additionally, the load current detector 620 can be used to monitor the load current I_LOAD to prevent the inductor current IL_SIDO from exceeding the load current I_LOAD.

Figure 7A:
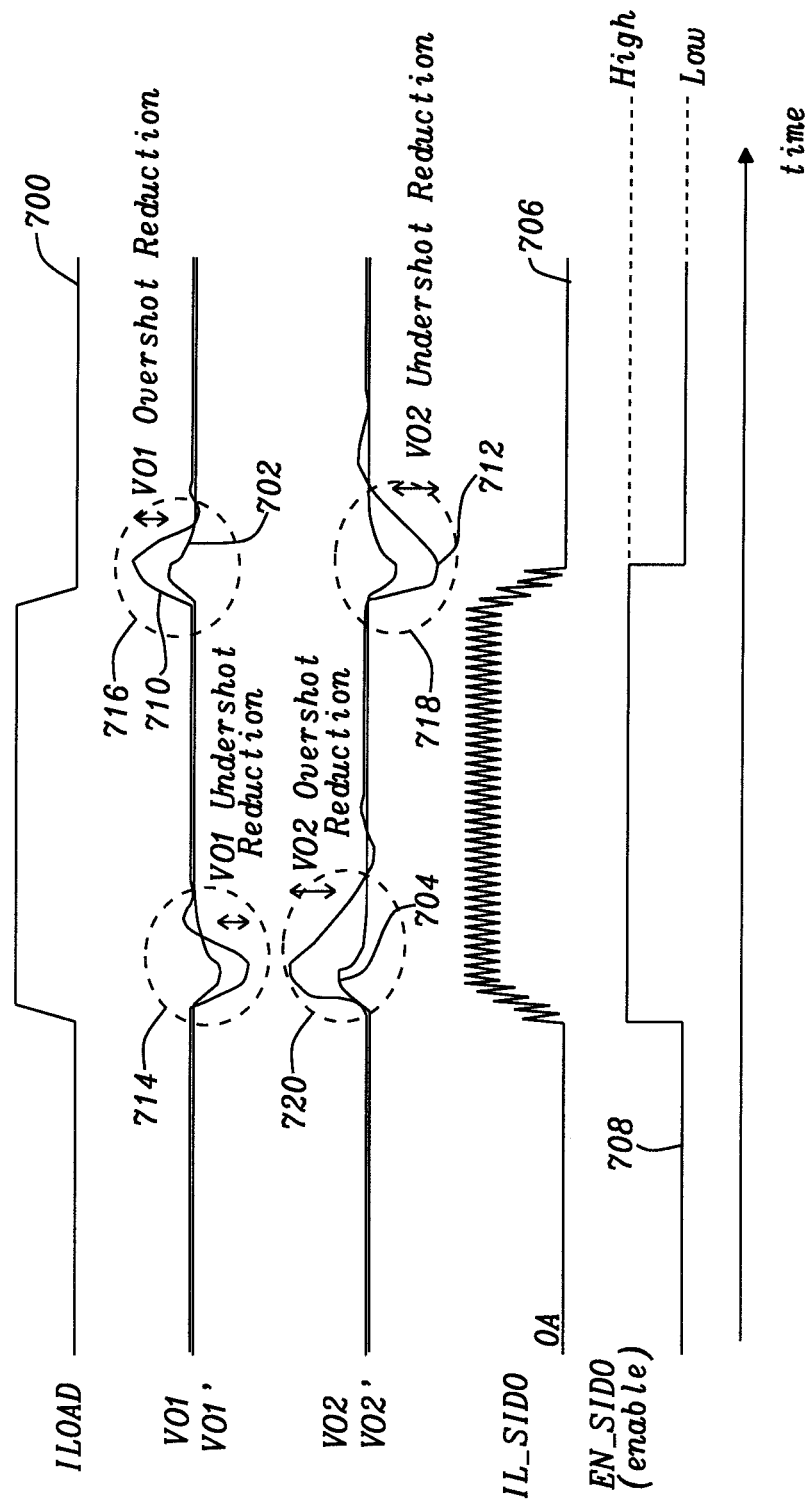
FIG. 7A is a further timing diagram showing the operation of the power supply system of FIG. 3 demonstrating a transient response improvement.

FIG. 7A is a timing diagram showing the operation of the power supply system 300. The following traces are shown on FIG. 7A: the load current I_LOAD 700, the output voltage VO1 702, the output voltage VO2 704, the inductor current IL_SIDO 706 and a state of the SIDO converter 216 (labelled 708). When the SIDO converter 216 is enabled the state 708 is high and when it is disabled, the state 708 is low.

Also shown are traces 710 and 712, which illustrate the output voltage VO1 and the output voltage VO2, respectively, when the SIDO converter 216 remains disabled throughout.

The output voltage VO1 exhibits an undershoot 714 and an overshoot 716 when the load current I_LOAD changes and the output voltage VO2 exhibits an undershoot 718 and an overshoot 720 when the load current I_LOAD changes. From FIG. 7(*a*) it can be seen that the transients (the overshoots and undershoots) are reduced by enabling the SIDO converter 216.

In the present embodiment, as long as the load current I_LOAD requested by the load 202 is higher than a threshold current, the SIDO converter 216 will be turned on to share a part of load transient current and improve the output transients. Likewise, when the load current I_LOAD requested by the load 202 is lower than a threshold current, the SIDO converter 216 will be turned off to minimize the transients. It will be appreciated that the threshold currents for enabling and disabling the SIDO converter 216 may be equal, or may alternatively be unequal.

FIG. 7A shows a transient response improvement when the SIDO converter 216 is turned on.

Figure 7B:
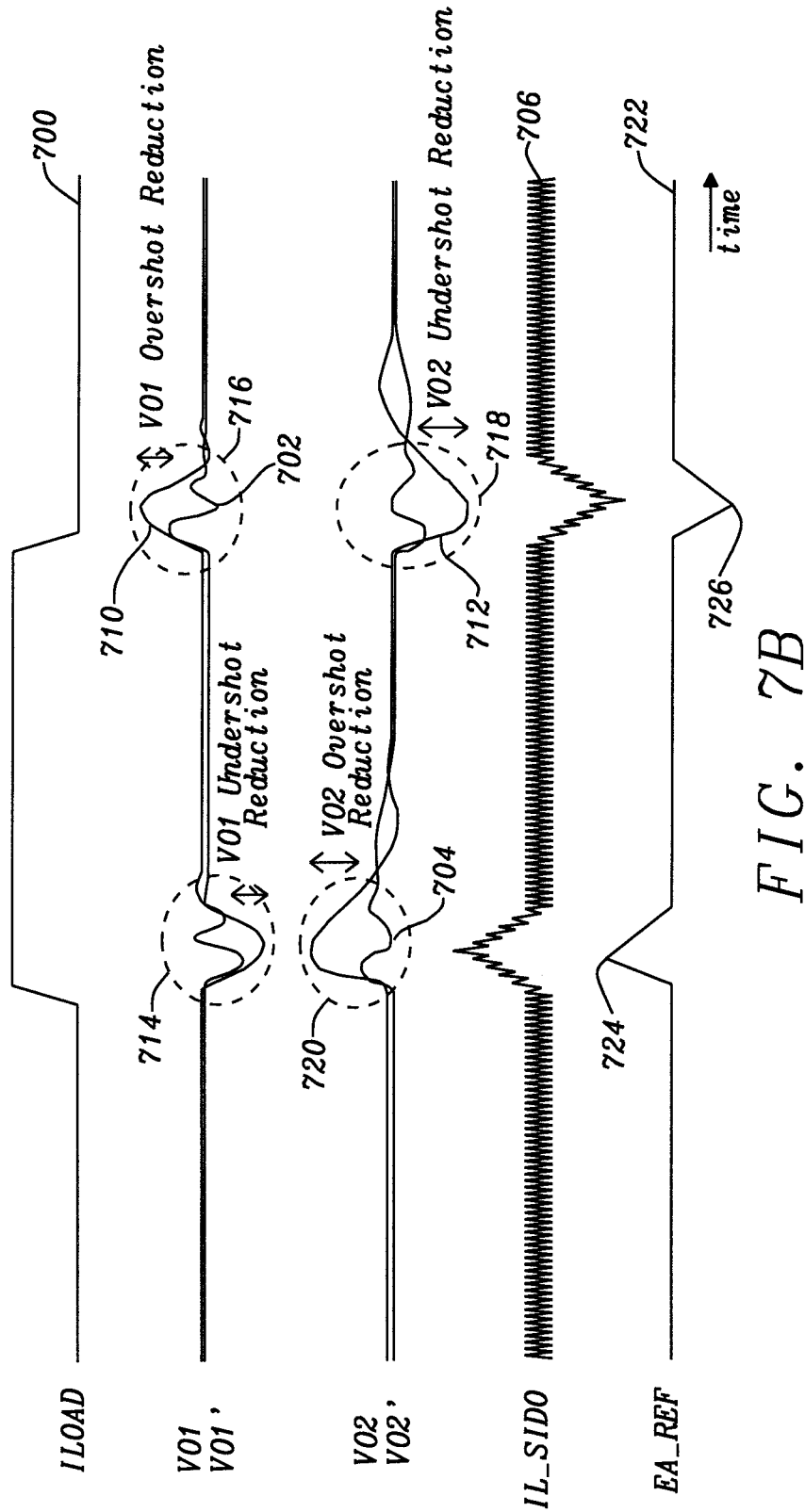
FIG. 7B is a timing diagram showing the operation of the power supply system of FIG. 3 implementing the SIDO converter and controller of FIG. 6B and demonstrating a transient response improvement.

FIG. 7B is a timing diagram showing the operation of the power supply system 300 displaying the operation of the embodiment of the SIDO converter 216 and controller 600 presented in FIG. 6B configured to detect transients and to reduce the transients.

Common features between different Figures share common reference numerals and variables. Also shown is a trace 722 showing the error amplifier reference EA_REF.

In the present embodiment, during operation, when the transient signal received by the transient detector 606 indicates that there has been a load transient, the transient detector 606 provides a transient detector output that adjusts the error amplifier reference EA_REF (for example at a point 724 and a point 726 in FIG. 7B). The transient detector output may be dependent on the magnitude of the transient and whether it is an overshoot or an undershoot.

During operation, if there is an undershoot on the boost converter 212 then the error amplifier reference EA_REF will be increased to increase the slave current I_slave to minimise the boost overshoot. Likewise when there is an overshoot on the boost converter 212 the error amplifier reference EA_REF will decrease I_slave to minimise the boost undershoot.

Compared with a single phase switching converter, the SIDO converter 216 can reduce transient overshoot and undershoot by adjusting the slave current I_slave. Compared to two-phase switching converters, the SIDO converter 216 uses one inductor rather than two while maintaining the transient performance improvement observed in two-phase converters over single-phase converters.

FIG. 7B shows a transient response improvement when the SIDO converter 216 response is modulated.

The power system 300 described herein can operate at a lower switching frequency to reduce switching losses and circuit complexity when compared to the power supply 100. For example, the powers supply 300 may run at 1.5 MHz with 2.2 uH inductors 302, 310, 322 as opposed to the power supply 100 running at 3 MHz with 1 uH inductors with higher saturation current. For different applications, the power supply 300 may operate at different switching frequencies.

Figure 8:
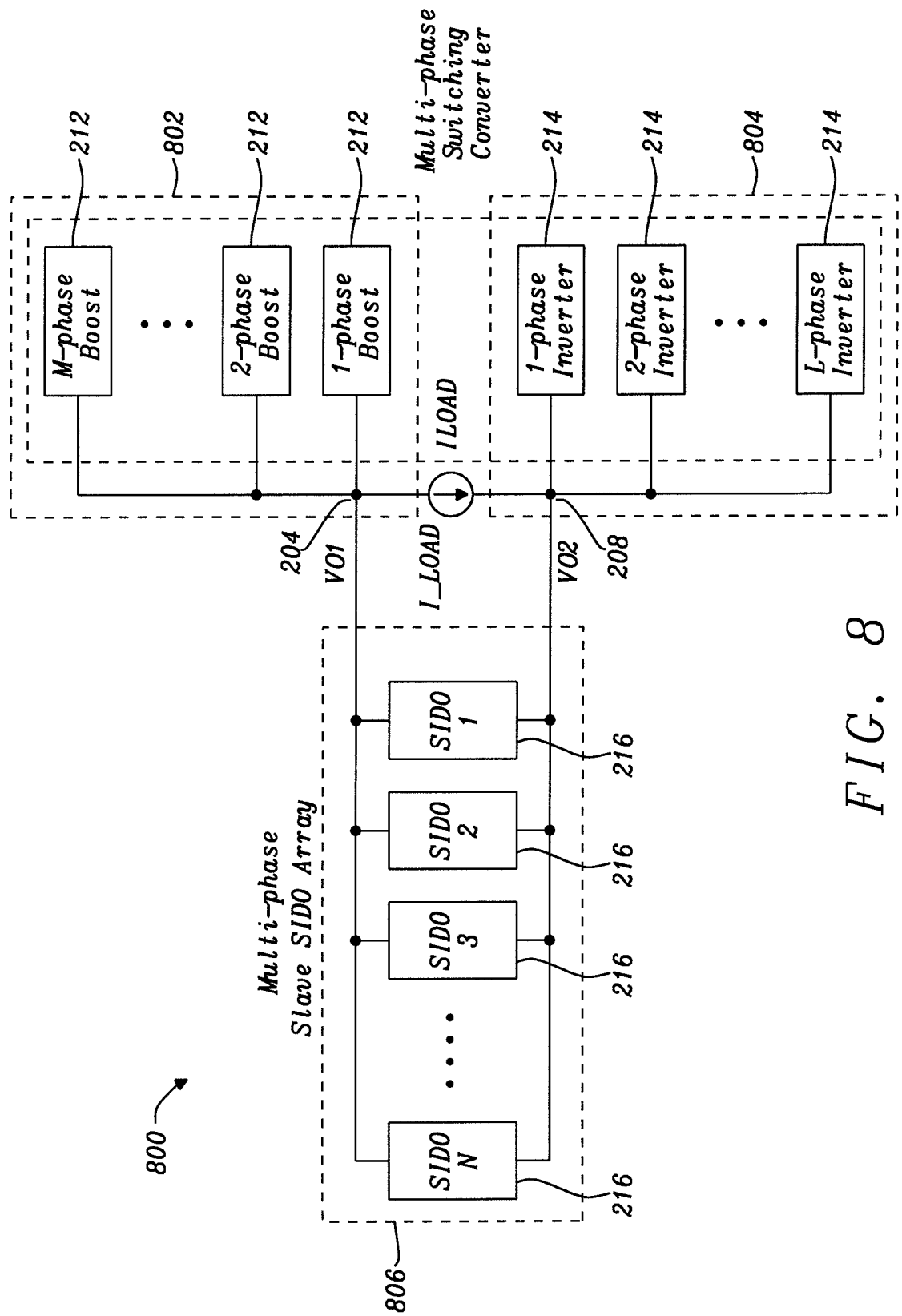
FIG. 8 is a schematic of a dual rail power supply system in accordance with a sixth embodiment of the present disclosure.

FIG. 8 is a schematic of a dual rail power supply system 800 in accordance with a sixth embodiment of the present disclosure. Common features between figures share common reference numerals and variables.

In the present embodiment, the power supply system 800 comprises a plurality of power converters 802 configured to provide the first voltage VO1 at the first voltage rail 204, a plurality of power converters 804 configured to provide the second voltage VO2 at the second voltage rail 208, a plurality of power converters 806 each comprising the output 218 coupled to the first voltage rail 204 and the output 220 coupled to the second voltage rail 208. The power converters 806 are configured to generate the slave current I_slave and to provide the slave current I_slave to the load 200 such that the load current I_LOAD comprises the slave current I_slave, during the first mode.

The present embodiment corresponds to the power supply system 200 but with the inclusion of additional power converters of the types previously described: the plurality of power converters 802 comprises a plurality of first power converters 212, the plurality of power converters 804 comprises a plurality of second power converters 214 and the plurality of power converters 806 comprises a plurality of third power converters 216. It will be clear to the skilled person how the power supply system 800 functions based on the description provided previously for the single converter embodiments (the power supply systems 200, 300).

It will be appreciated that in further embodiments one or two of the plurality of power converters 802, 804, 806 may alternatively be replaced by a single converter of the relevant type as previously described.

The power supply system 800 can provide a super high driving current power system. In a specific embodiment where the plurality of power converters 806 comprises SIDO converters 216, the increase in the number of slave SIDOs to provide a multi-phase slave SIDO array may be controlled by central micro controller to provide a large amount of driving current.

The benefit of this embodiment is that by increasing the number of SIDO converters 216 the number of power converters 212, 214 can be reduced. For example, increasing the SIDO converter 216 by one can enable a reduction in the number of both multi-phase converters 212, 214 by one, thereby achieving a balanced system in terms of cost performance by reducing the number of required components.

A standalone SIDO converter cannot work as an auxiliary current supplier to support additional current in parallel as provided by the SIDO converter 216 described herein. The SIDO converter 216 provides a new method to enlarge the current capability of both positive and negative power rails 204, 208 by using less inductors when compared with the power supply 100 of the prior art.

Figure 9B:
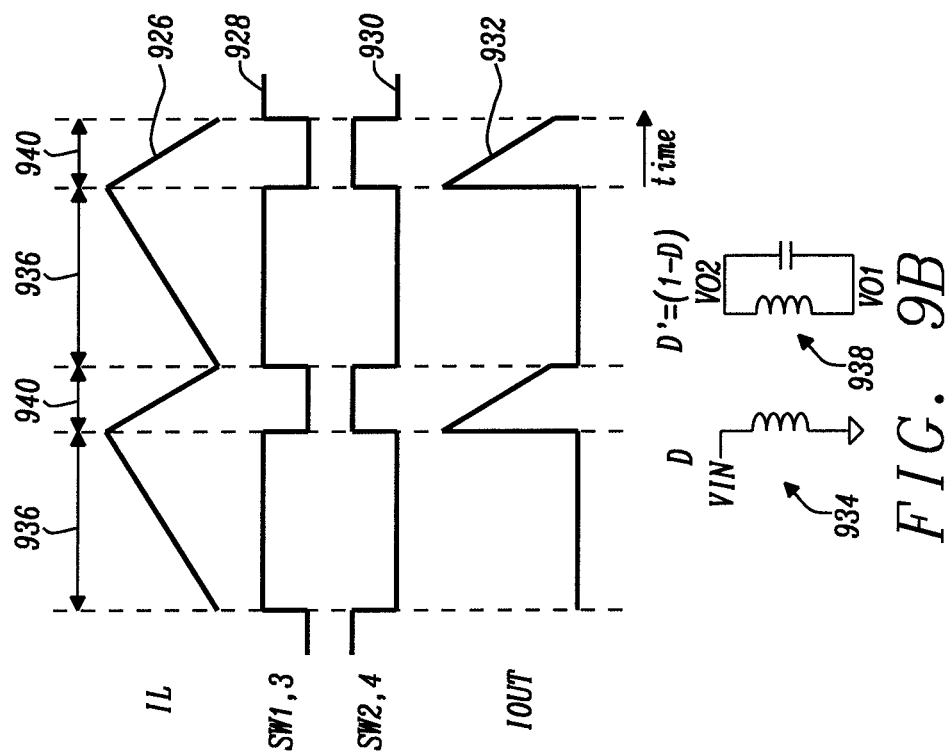
FIG. 9B is a timing diagram showing the operation of the SIDO converter of FIG. 4A.
Figure 9A:
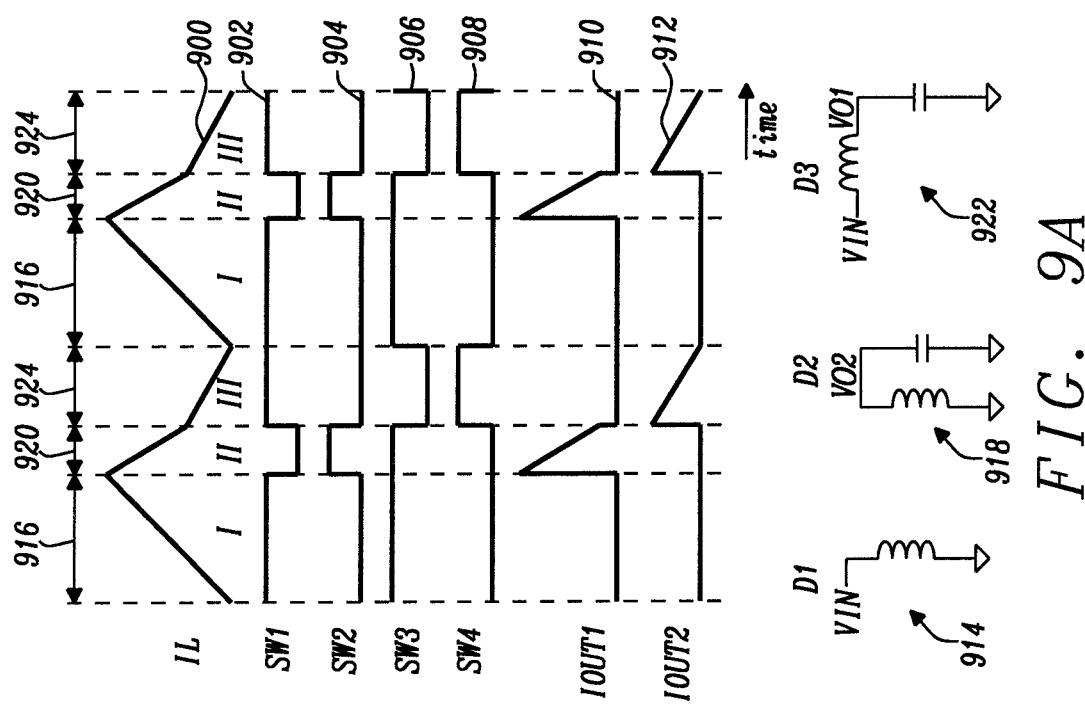
FIG. 9A is a timing diagram showing the operation of a standalone SIDO converter.

FIGS. 9A and 9B are timing diagrams showing the operations of a standalone SIDO converter and the SIDO converter 216, respectively. FIGS. 9A and 9B demonstrate why the efficiency of the standalone SIDO converter is less than the SIDO converter 216.

In the present example, the circuits of the standalone converter and the SIDO converter 216 are the same with the difference being the switching operation as presented in FIGS. 9A and 9B.

Shown on FIG. 9A are the inductor current 900, a state 902 of the switch SW1, a state 904 of the switch SW2, a state 906 of the switch SW3, a state 908 of the switch SW4 a current output 910 at the first voltage rail 204 and a current output 912 at the second voltage rail 208.

Also shown are a circuit configuration 914 of the standalone SIDO in a first phase 916, a circuit configuration 918 of the standalone SIDO in a second phase 920 and a circuit configuration 922 of the standalone SIDO in a third phase 924.

Operation of the standalone SIDO may be described by the following equations:

$$\frac{VIN}{L}D1 + \frac{VO2}{L}D2 + \frac{VIN-VO1}{L}D3 = 0 \quad (1)$$

$$VIN(D1+D3) = VO1 \cdot D3 - VO2 \cdot D2 \quad (2)$$

where L is the inductance of the inductor, D1 is the first phase 916 as a fraction of the sum of the first phase, second phase and third phases 916, 920, 924, D2 is the second phase 920 as a fraction of the sum of the phases 916, 920, 924 and D3 is the third phase 924 as a fraction of the sum of the phases 916, 920, 924.

Shown on FIG. 9B are the inductor current 926, a state 928 of the switches SW1, SW3, a state 930 of the switches SW2, SW4 current output 932 (being the slave current I_slave as previously described).

Also shown are a circuit configuration 934 of the SIDO converter 216 in a first phase 936 and a circuit configuration 938 of the SIDO converter 216 in a second phase 940.

Operation of the SIDO converter 216 may be described by the following equations:

$$\frac{VIN}{L}D + \frac{VO2 - VO1}{L}(1-D) = 0 \qquad (3)$$

$$\frac{VO2 - VO1}{VIN} = \frac{D}{1-D} \qquad (4)$$

$$D = \frac{VO2 - VO1}{VO2 - VO1 + VIN} \qquad (5)$$

where D is the duty cycle and the other symbols have their meaning as previously described.

According to the SIDO converter 216 architecture, the operation is similar to 4-switch non-inverting Buck-Boost converter. The conventional operation of the standalone SIDO which operates at least 3-phase control is different from that of the SIDO converter 216.

Assuming the duty cycle D is the same, the efficiency of the standalone SIDO converter, for example a Boost converter having two power switches, is higher than Buck-Boost (having four power switches) because of lower turn-on resistance of the buck-boost converter. For the same duty cycle and turn-on resistance, the efficiency of SIDO converter 216 (like Buck-Boost) is also higher than standalone SIDO because operation behaviour. One reason is the standalone SIDO needs more switching phases to achieve dual output operation which means it consume additional switching and driving loss. Additionally, the standalone SIDO also needs an additional dead time period which contributes more power loss owing to 3-phase control (especially in heavy load).

The standalone SIDO requires three phases to operate, whereas the SIDO converter 216 of the present disclosure uses two phases. As no additional switching phase is needed, the SIDO converter 216 of the present disclosure is more efficient than the standalone SIDO.

In terms of a standalone SIDO converter having two phases (by coupling two SIDO converters in parallel), it is not suitable for a high current density power system due to insufficient efficiency and current capability performance. Furthermore, the cross-regulation phenomenon in standalone SIDO might deteriorate the static and transient performance. On top of that, 2-phase standalone SIDO needs more complicated circuitry for implementation.

In summary, the power supply system 300 as described herein provides a dual rail power supply system that can support high current applications whilst minimising the number of components, such as inductors, and limiting the PCB area that is required. In particular, when using the SIDO converter 216 only a single inductor is required to provide a slave current, rather than two or more.

Various improvements and modifications may be made to the above without departing from the scope of the disclosure.

What is claimed is:

1. A dual rail power supply system for providing a first voltage and a second voltage to a load that is configured to draw a load current from the dual rail power supply system, comprising:
   a first voltage rail for coupling to a first terminal of the load;
   a second voltage rail for coupling to a second terminal of the load;
   a first power converter configured to provide the first voltage at the first voltage rail;
   a second power converter configured to provide the second voltage at the second voltage rail;
   a third power converter comprising a first output coupled to the first voltage rail and a second output coupled to the second voltage rail; wherein:
   the third power converter is configured to generate a slave current and to provide the slave current to the load such that the load current comprises the slave current, during a first mode.

2. The dual rail power supply system of claim 1, wherein:
   the first power converter and the second power converter are configured to provide a master current to the load during the first mode, such that the load current comprises the master current and the slave current.

3. The dual rail power supply system of claim 2, wherein:
   the first power converter and the second power converter are configured to provide the master current to the load during a second mode, such that the load current comprises the master current.

4. The dual rail power supply system of claim 3, wherein:
   the third power converter is configured to switch off during the second mode such that the load current does not comprise the slave current during the second mode.

5. The dual rail power supply system of claim 3, wherein the dual rail power supply system is configured to switch from the second mode to the first mode when the load current requested by the load exceeds a threshold current and/or to switch from the first mode to the second mode when the load current requested by the load falls below the threshold current.

6. The dual rail power supply system of claim 1, wherein the first power converter comprises a switching converter.

7. The dual rail power supply system of claim 1, wherein the second power converter comprises an inverter or a negative capacitive converter.

8. The dual rail power supply system of claim 1, wherein the third power converter comprises a single inductor dual output (SIDO) converter.

9. The dual rail power supply system of claim 8, wherein the SIDO converter comprises a first inductor.

10. The dual rail power supply system of claim 9, wherein the SIDO converter comprises:
    a first set of switches configured to couple the first inductor between a third voltage and a fourth voltage in a first state and to decouple the first inductor from the third voltage and the fourth voltage in a second state; and
    a second set of switches configured to couple the first inductor between the first voltage rail and second voltage rail in the first state and to decouple the first inductor from the first voltage rail and the second voltage rail in the second state.

11. The dual rail power supply system of claim 10, wherein the third voltage is greater than the fourth voltage.

12. The dual rail power supply system of claim 10, wherein:
    the first inductor is charged when the first set of switches are in the first state and the second set of switches are in the second state; and
    the first inductor is discharged to provide the slave current to the load when the first set of switches are in the second state and the second set of switches are in the first state.

13. The dual rail power system of claim 10, wherein the SIDO converter comprises:

a controller configured to control a switching operation of the first set of switches and the second set of switches, by switching each of the sets of switches between the first state and the second state.

14. The dual rail power system of claim 13, wherein the controller is configured to provide one of current mode control, voltage mode control, hysteresis mode control and constant on/off time mode control.

15. The dual rail power supply system of claim 14, wherein the controller is configured to provide current mode control by sensing an inductor current and controlling the switching operation of the first set of switches and the second set of switches based on the sensed inductor current, the inductor current being a current flowing through the first inductor.

16. The dual rail power supply system of claim 15, wherein the controller comprises a current sensor configured to:
sense the inductor current and to provide a feedback voltage that is a replica of the slave current or an average of the slave current, wherein:
the switching operation of the first set of switches and the second set of switches are dependent on the feedback voltage.

17. The dual rail power supply system of claim 16, wherein the controller comprises a transient detector configured to:
detect a transient in at least one of the first voltage and the second voltage; and:
to adjust the slave current to compensate for the transient, when a transient is detected.

18. The dual rail power supply system of claim 17, wherein the controller comprises an error amplifier configured to:
receive input signals that are dependent on the feedback voltage and the detection of transients;
provide an error amplifier output signal, wherein:
the switching operation of the first set of switches and the second set of switches are dependent on the error amplifier output signal.

19. The dual rail power supply system of claim 13, wherein the controller comprises a transient detector configured to:
detect a transient in at least one of the first voltage and the second voltage; and:
to adjust the slave current to compensate for the transient, when a transient is detected.

20. A method of providing a dual rail power supply system for providing a first voltage and a second voltage to a load that draws a load current from the dual rail power supply system, the dual rail power supply system comprising a first voltage rail for coupling to a first terminal of the load, a second voltage rail for coupling to a second terminal of the load, the method comprising
providing the first voltage at the first voltage rail using a first power converter;
providing the second voltage at the second voltage rail using a second power converter;
generating a slave current and providing the slave current to the load such that the load current comprises the slave current, during a first mode, using a third power converter comprising a first output coupled to the first voltage rail and a second output coupled to the second voltage rail.

21. A dual rail power supply system for providing a first voltage and a second voltage to a load that is configured to draw a load current from the dual rail power supply system, comprising:
a first voltage rail for coupling to a first terminal of the load;
a second voltage rail for coupling to a second terminal of the load;
one or more first power converters configured to provide the first voltage at the first voltage rail;
one or more second power converters configured to provide the second voltage at the second voltage rail;
one or more third power converters comprising a first output coupled to the first voltage rail and a second output coupled to the second voltage rail; wherein:
the third power converter is, or the third power converters are, configured to generate a slave current and to provide the slave current to the load such that the load current comprises the slave current, during a first mode.

22. A method of providing a dual rail power supply system for providing a first voltage and a second voltage to a load that draws a load current from the dual rail power supply system, the dual rail power supply system comprising a first voltage rail for coupling to a first terminal of the load, a second voltage rail for coupling to a second terminal of the load, the method comprising:
providing the first voltage at the first voltage rail using one or more first power converters;
providing the second voltage at the second voltage rail using one or more second power converters;
generating a slave current and providing the slave current to the load such that the load current comprises the slave current, during a first mode, using one or more third power converters comprising a first output coupled to the first voltage rail and a second output coupled to the second voltage rail.

* * * * *